(12) United States Patent
Roy et al.

(10) Patent No.: US 12,431,952 B2
(45) Date of Patent: Sep. 30, 2025

(54) SPATIAL AND FREQUENCY DOMAIN BEAM MANAGEMENT USING TIME SERIES INFORMATION

(71) Applicant: MEDIATEK INC., Hsinchu (TW)

(72) Inventors: Abhishek Roy, San Jose, CA (US); Vaibhav Pradeep Bhosale, San Jose, CA (US); Gyu Bum Kyung, San Jose, CA (US); Chia-Chun Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 86 days.

(21) Appl. No.: 18/369,488

(22) Filed: Sep. 18, 2023

(65) Prior Publication Data

US 2024/0106510 A1 Mar. 28, 2024

Related U.S. Application Data

(60) Provisional application No. 63/376,615, filed on Sep. 22, 2022, provisional application No. 63/376,614, filed on Sep. 22, 2022.

(51) Int. Cl.
*H04L 5/12* (2006.01)
*H04B 7/06* (2006.01)

(52) U.S. Cl.
CPC ....... *H04B 7/0639* (2013.01); *H04B 7/06958* (2023.05)

(58) Field of Classification Search
CPC .......................... H04B 7/063; H04B 7/06958
USPC ................ 375/262, 260, 259, 219, 295, 316
See application file for complete search history.

(56) References Cited

U.S. PATENT DOCUMENTS

2020/0351790 A1* 11/2020 Hsieh ................ H04W 52/0245
2022/0408381 A1* 12/2022 Pezeshki .............. H04B 7/0695

* cited by examiner

*Primary Examiner* — Zewdu A Kassa
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be wireless equipment. The wireless equipment selects a first subset of beams to be utilized for beam management. The beams are from a set of first type of beams used for communication with a base station or a UE. The wireless equipment measures signals transmitted on a second subset of beams. The beams are from the set of first type of beams or from a set of second type of beams. The wireless equipment measures the signals over a time window. The wireless equipment inputs the measurements to a computational model. The wireless equipment receives predictions of channel measurements on the first subset of beams from the computational model.

17 Claims, 9 Drawing Sheets

SPATIAL AND FREQUENCY DOMAIN BEAM MANAGEMENT USING TIME SERIES INFORMATION

CROSS-REFERENCE TO RELATED APPLICATION(S)

This application claims the benefits of U.S. Provisional Application Ser. No. 63/376,614, entitled "SPATIOTEMPORAL DOMAIN BEAM MANAGEMENT USING TIME SERIES DATA" and filed on Sep. 22, 2022, and U.S. Provisional Application Ser. No. 63/376,615, entitled "FREQUENCY DOMAIN BEAM MANAGEMENT USING TIME SERIES" and filed on Sep. 22, 2022, both of which are expressly incorporated by reference herein in their entirety.

BACKGROUND

Field

The present disclosure relates generally to communication systems, and more particularly, to techniques of spatial and frequency domain beam management using time series information.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be wireless equipment. The wireless equipment selects a first subset of beams to be utilized for beam management. The beams are from a set of first type of beams used for communication with a base station or a UE. The wireless equipment measures signals transmitted on a second subset of beams. The beams are from the set of first type of beams or from a set of second type of beams. The wireless equipment measures the signals over a time window. The wireless equipment inputs the measurements to a computational model. The wireless equipment receives predictions of channel measurements on the first subset of beams from the computational model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
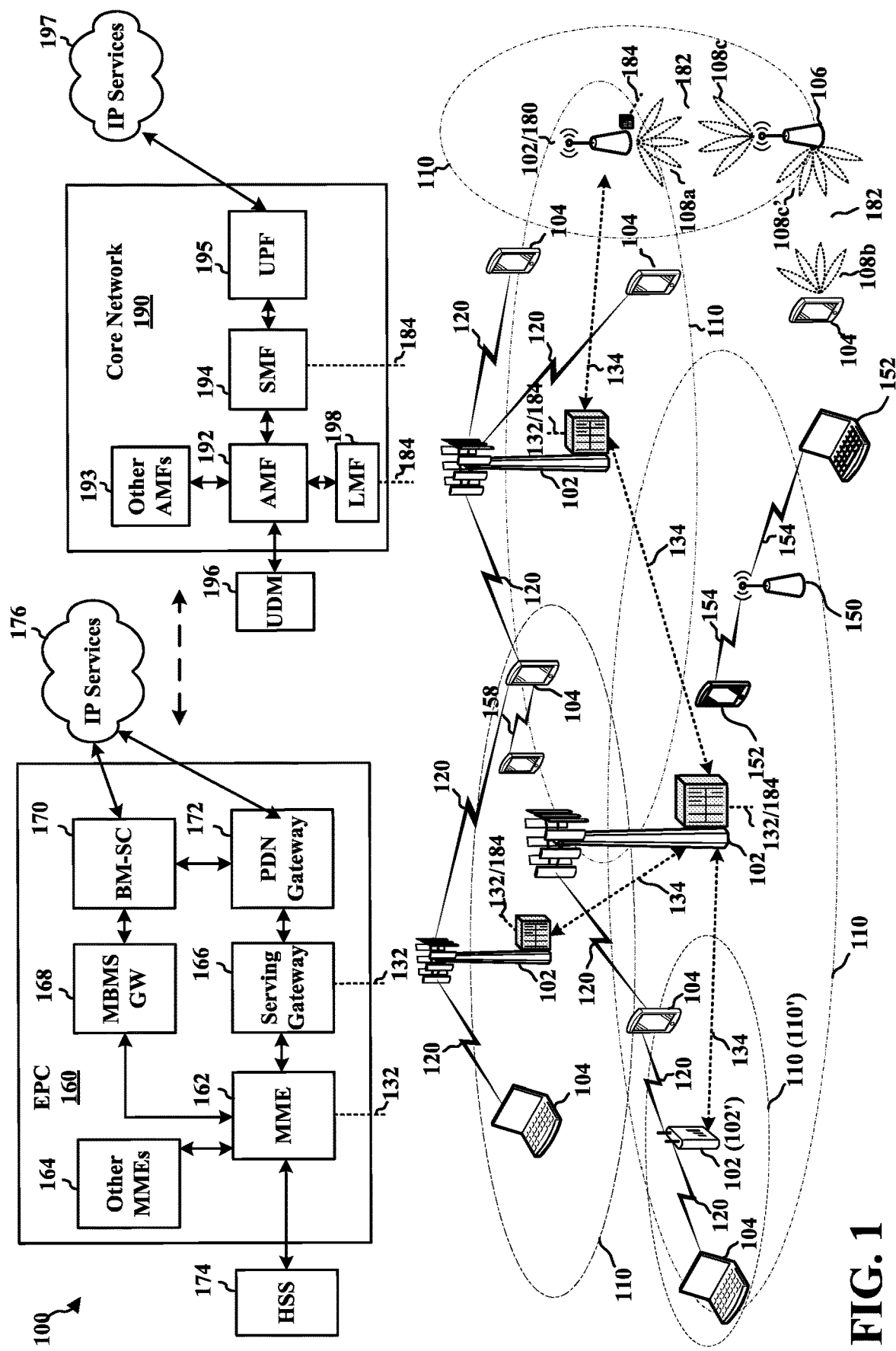
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
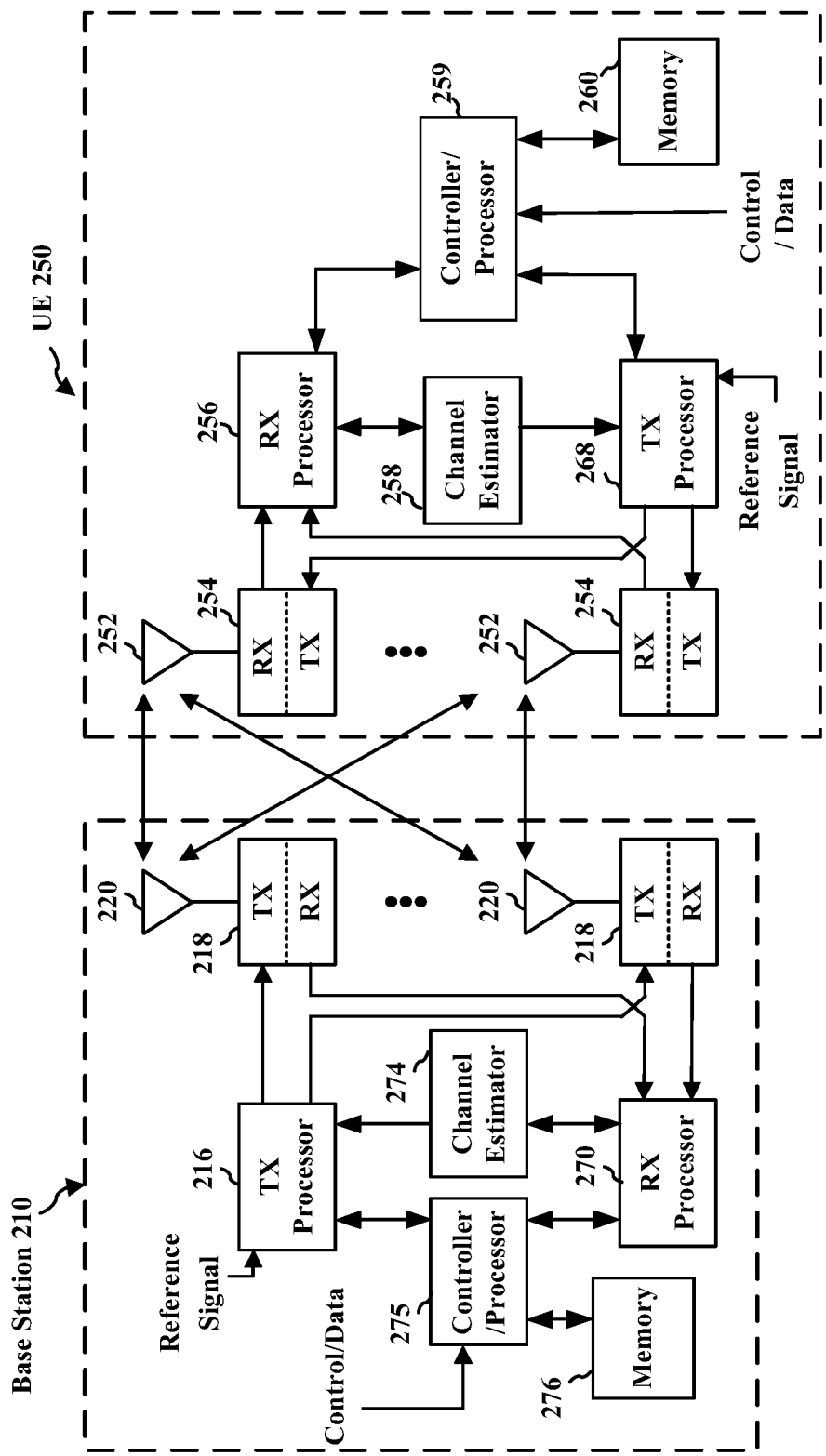
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
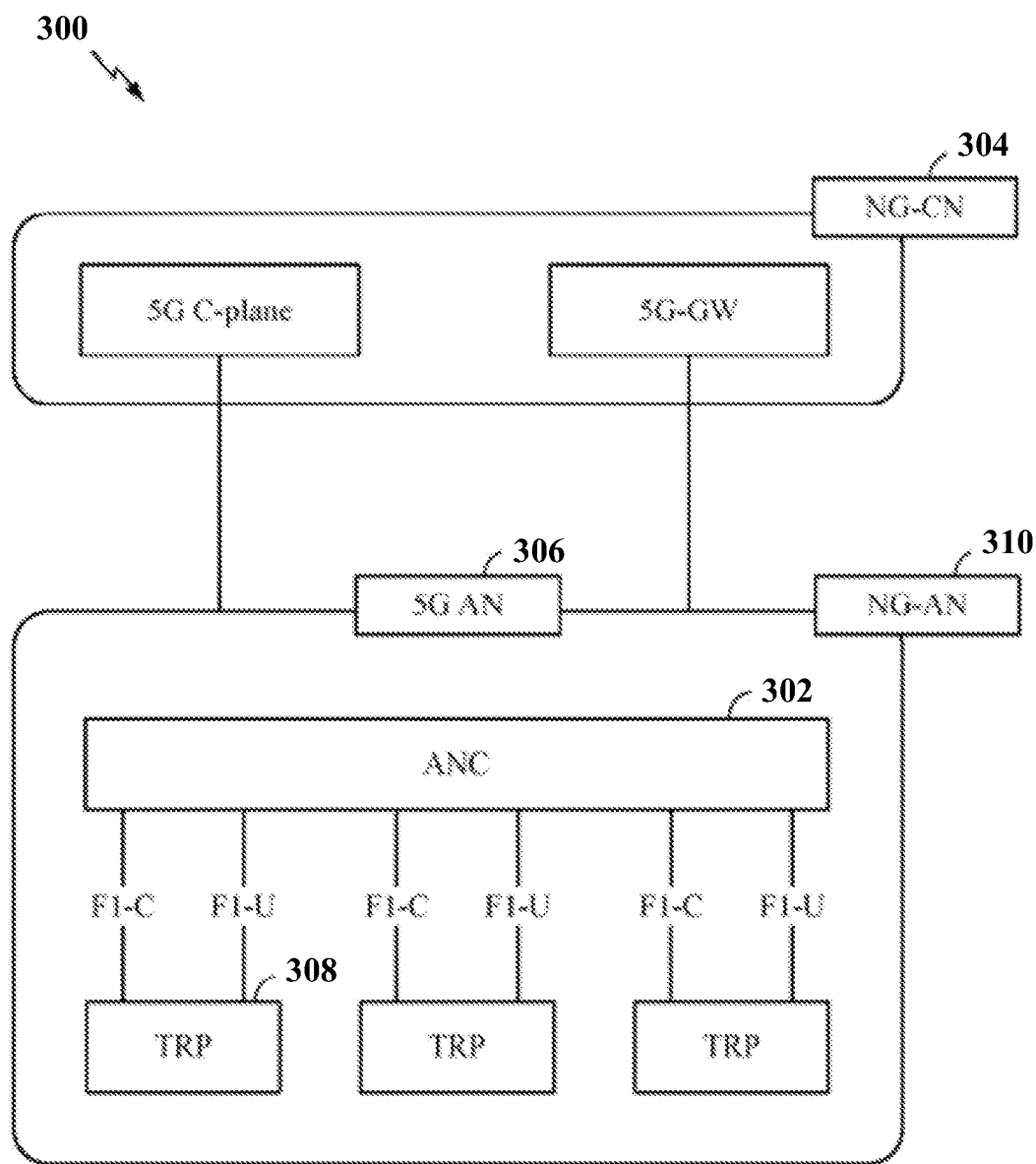
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
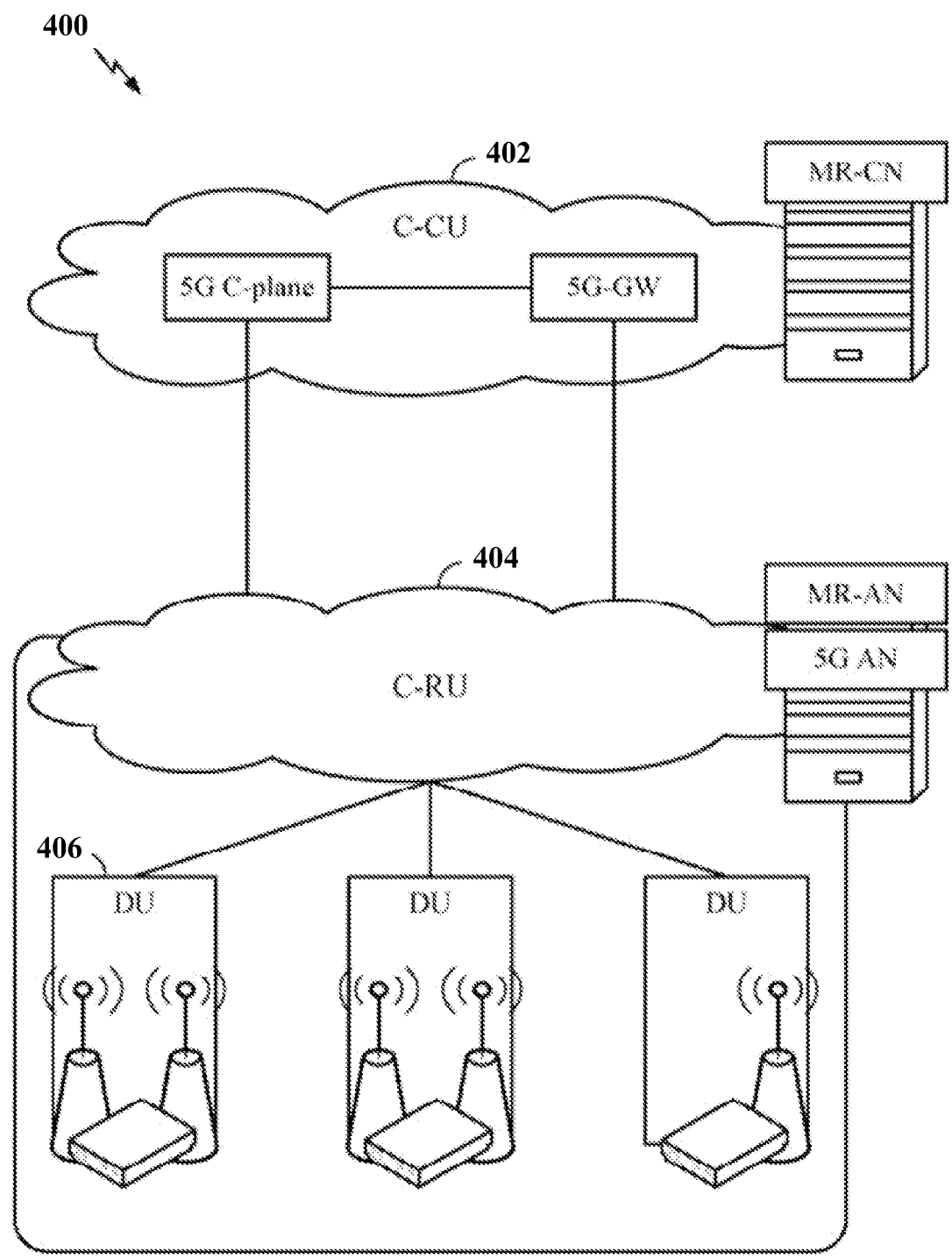
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
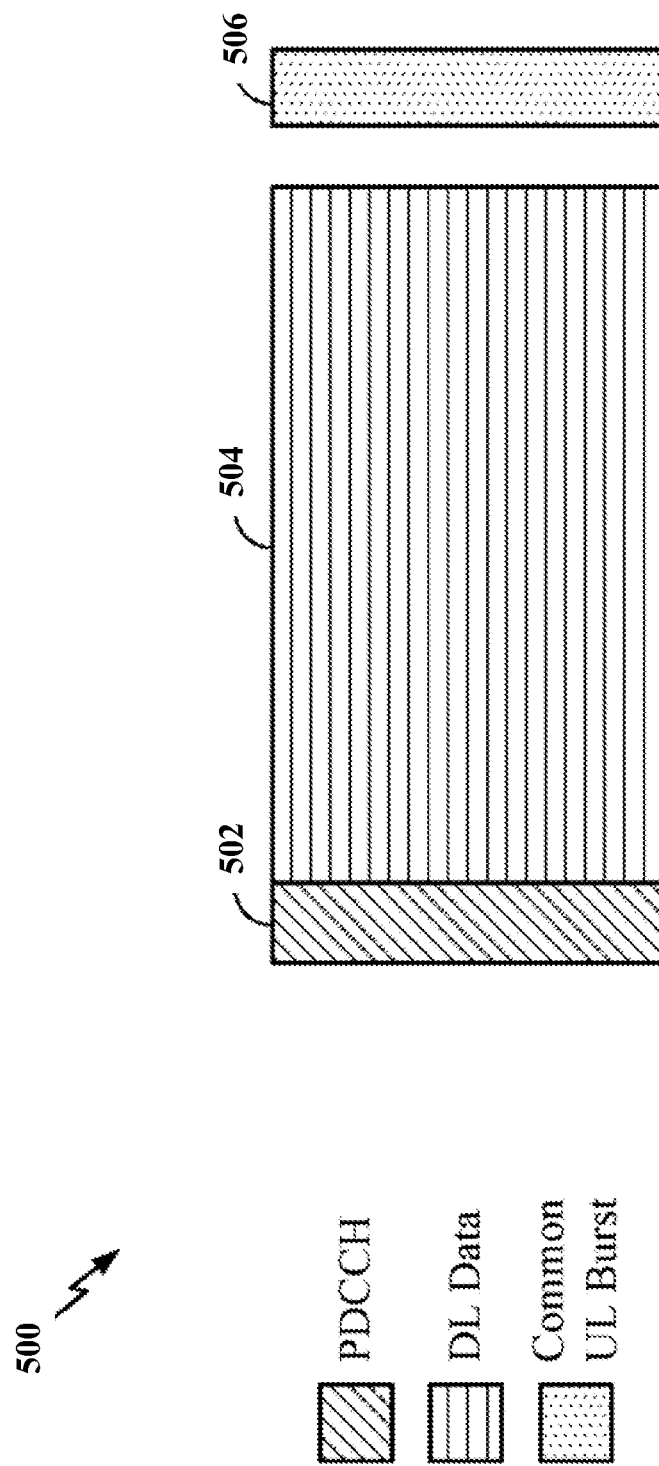
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
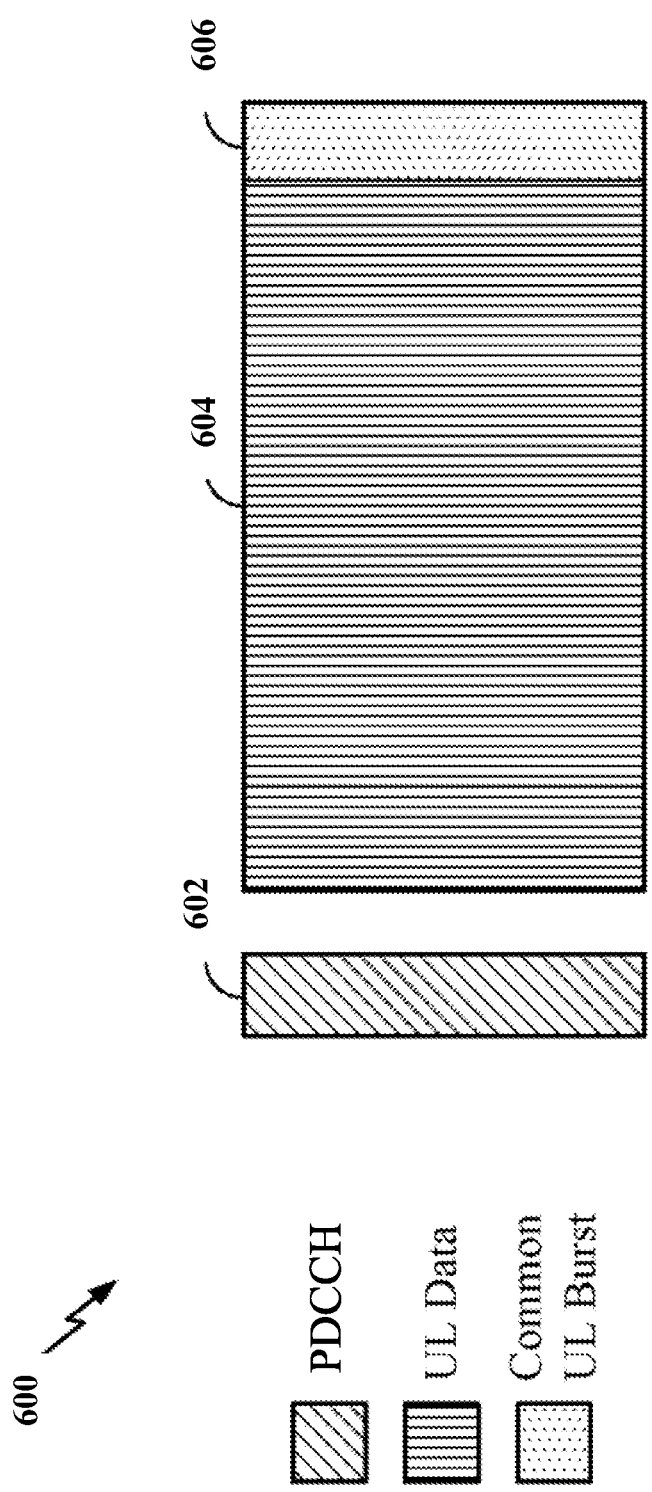
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
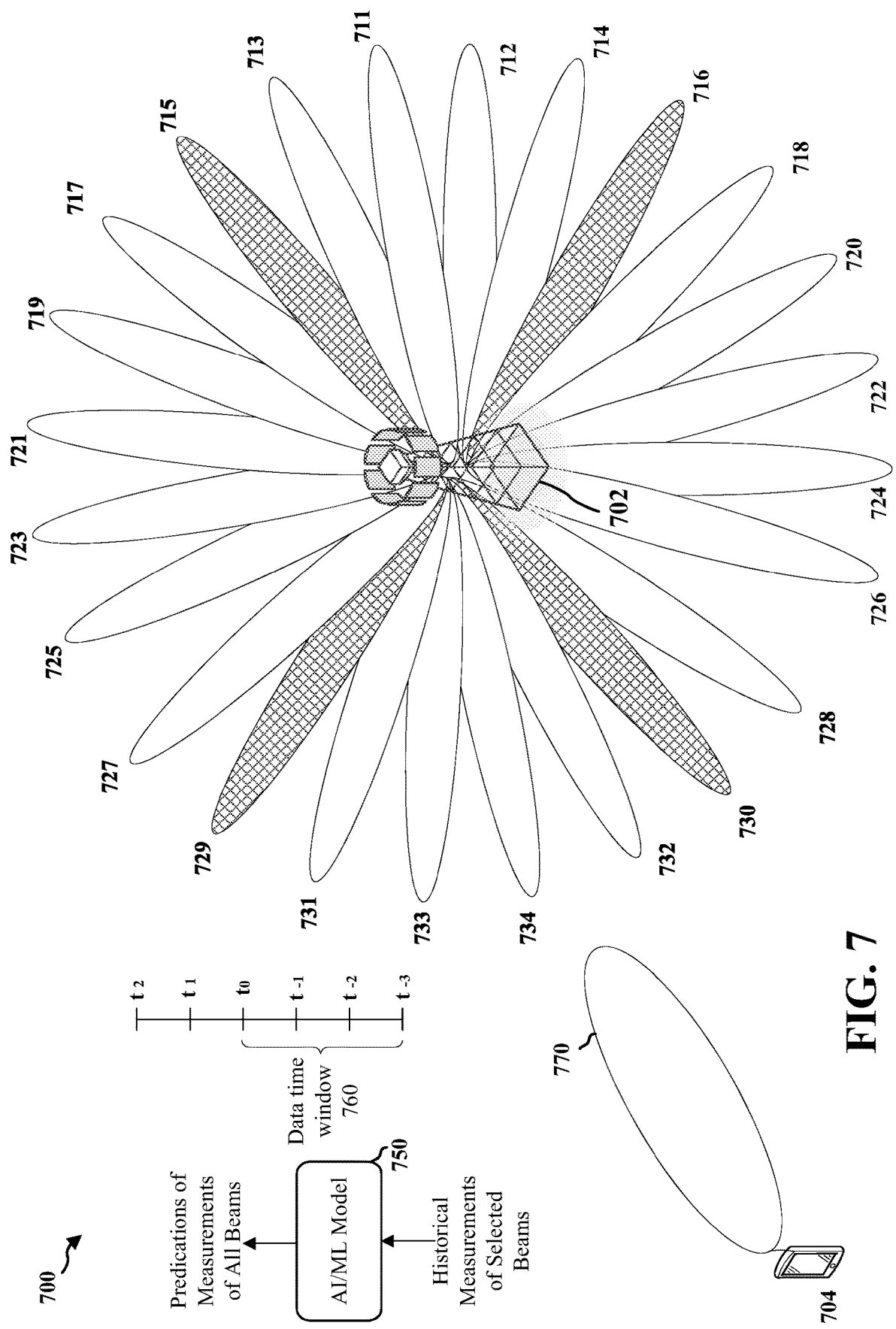
FIG. 7 is a diagram illustrating spatial domain beam prediction based on machine learning

FIG. 7 is a diagram illustrating spatial domain beam prediction based on machine learning. In this example, the base station 702 transmits beams 711-734 simultaneously in various directions. After identifying the incoming beams, the UE 704 can calculate the L1-RSRP for each beam. The L1-RSRP is the physical layer's average received signal power per resource element, measured on resource elements that are carrying either the secondary synchronization signal or the CSI-RS.

A machine learning algorithm is used to analyze history of signal strengths from a subset of beams and tries to find patterns or trends in the data. This helps predict signal strengths for the remaining unmeasured beams. By recognizing patterns in the historical data from the subset of beams, the algorithm can predict signal strengths for the other beams even when the UE is moving.

In this example, the base station 702 is equipped with multiple antennas and has the capability to transmit the 24 different beams 711-734 simultaneously in various directions. The UE 704 which is moving from time to time, is equipped with its own antennas, and periodically measures channel metrics such as RSRP from a strategically chosen subset of 4 out of the 24 beams (e.g., beams 715, 716, 729 and 730) transmitted by the base station.

The measurements collected from these 4 beams are saved over time as historical data. The historical data captures the channel metrics over time for the subset of beams, painting a dynamic portrait of the UE 704's interaction with those beams. The UE 704 may be configured with a historical data time window 760 the measurements during which are stored at the UE 704. In the example, the current time is $t_0$. The historical data time window 760 is from time $t_{-3}$ to time $t_0$. The measurements data of the subset of beams 715, 716, 729 and 730 and obtained during the historical data time window 760 are stored at the UE 704 and are used as input to the AI/ML model 750 to predict measurements of beams that are not measured at the current time $t_0$ and measurements of all beams at future time $t_1$, $t_2$.

The historical data serves as input to the machine learning algorithm to predict channel metrics for the unmeasured beams, guiding the UE 704 on which beam to focus on when it needs to communicate with the base station 702. The algorithm can therefore predict channel metrics for all beams based on analyzing patterns and trends in the historical data from the subset of beams.

Another subset of beams (e.g., beams 711, 721, 724 and 734), which typically are not measured in routine circumstances, may be periodically sampled and their channel metrics recorded. This serves to validate the algorithm's predictions against real-world performance, while also updating the model. The periodic measurements contribute to algorithm refinement by updating its weights and parameters. As the machine learning algorithm matures, its predictions for optimal beams become increasingly accurate. When the UE 704 initiates communication, it can select a UE transmission or reception beam 770 likely to yield superior signal quality (e.g. an optimal beam) based on the predictions.

The base station 702 and the UE 704 utilize the same AI/ML model(s) for beam prediction. The base station 702 and the UE 704 may employ the same AI/ML model(s) in order to establish a shared understanding of data patterns and behaviors, leading to consistent decision-making and enhanced accuracy of predictions and responses. By utilizing the same AI/ML models, the base station 702 and the UE 704 create a unified approach that improves the system's ability to manage network resources efficiently.

Rather than identifying the single best beam, the approach involves predicting the top k beams likely to have the highest channel metrics. Focusing on the top k beams provides superior accuracy in many scenarios. The prediction of the top k beams is achieved by estimating them based on the top k channel metric values. This aligns well with real-world communication needs, enhancing system performance.

Figure 8:
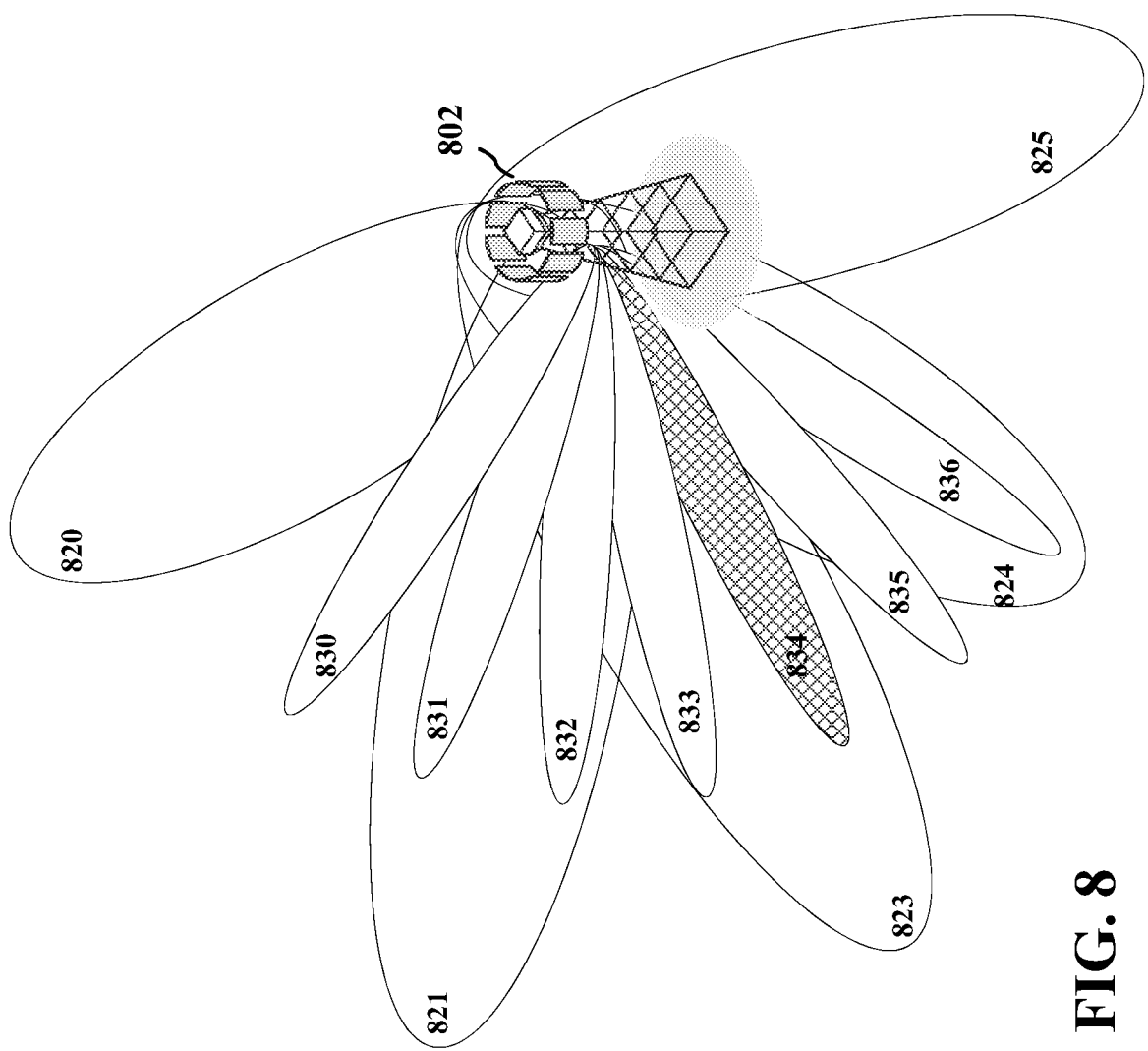
FIG. 8 is a diagram illustrating cross frequency beam prediction based on machine learning.
Figure 8:

FIG. 8 illustrates cross-frequency beam prediction based on machine learning. FR2 connection enables directional communication with a larger number of antenna elements and provides an additional beamforming gain, which compensates for the propagation loss. However, directional links would need precise alignment of beams at the base station 702 and UE 704. This introduces the need for efficient management of beams where the UE 704 and the base station 702 regularly identify the optimal beams to work on at any given point of time. A base station 802 may serve both FR1 and FR2 frequency bands. The base station 802 transmits beams 820-825 in the FR1 band and beams 830-836 in the FR2 band simultaneously in various directions.

Despite differences between FR1 and FR2, similarities exist in array geometry, path numbers, and environment. Historical data from FR1 can provide insights for frequency beam management in FR2, improving performance and efficiency. Acquiring channel data in FR1 is more costeffective than for FR2. Historical data plays a key role in optimizing beam management by capturing details about a UE's trajectory. By leveraging historical patterns, the system can orchestrate precise beam predictions and adept strategies.

A UE 804, moving over time, periodically measures RSRP from beams 820-825. These measurements reflect the signal strength received from beams 820-825 at the UE's location. The measurements are saved over time, capturing RSRP over time and portraying the UE's interaction with beam 820. The historical data enables the machine learning algorithm to analyze the UE's trajectory and movement patterns to guide beam predictions.

Periodic measurements of some FR2 beams serve two purposes: validating predictions and offering real-world data to refine the algorithm. This validation loop enhances prediction accuracy. Intermittent measurements also facilitate dynamic training, with the algorithm's weights updated based on new data, allowing adaptation to environmental shifts since initial deployment.

As described supra, the base station and the UE need to use the same AI/ML model(s). When both ends of the communication chain use the same models, it establishes a shared understanding of data patterns and behaviors.

The ML model inference needs to be bounded by the time available for making the beam selection process. The time-bound inference ensures that the beam selection process doesn't introduce unnecessary delays or disruptions. The faster the model can predict the optimal beam, the quicker the communication link can be established or adjusted, leading to improved user experiences.

The models deployed in UEs need to be synched after the UEs are handed over to target cell. By synchronizing the models after a handover, the UEs can leverage up-to-date information to make informed decisions about beam selection, resource allocation, and interference management.

The window-size should be small enough so that the historical data can be stored in cache (limited memory size). One key factor in choosing the window size is the need to store historical data within the cache. The cache serves as a fast-access memory location that holds frequently accessed information, contributing to the overall speed and responsiveness of the system.

The entire model needs to be loaded in the chip. Furthermore, the window size should align with the chip's capability to load the entire machine learning model. Chips have a finite capacity for storing and processing data, including the model parameters and associated calculations. Ensuring that the entire model can be loaded onto the chip is crucial for maintaining the efficiency of model inference. A balance needs to be struck between the window size and the model's complexity to prevent overwhelming the chip's resources and causing potential performance degradation. In essence, the window size should strike a delicate balance between the need to store historical data within the cache for efficient model operation and ensuring that the complete model can be loaded onto the chip for accurate and timely predictions. This thoughtful consideration guarantees that the machine learning system functions optimally within the given memory and processing constraints, ultimately contributing to the success of the overall communication framework.

As described supra, beam prediction can be conducted in the base station. The UE can provide a range of essential information that significantly aids the beam management process. This includes details about beam patterns, offering insights into how the device's antenna array is configured for optimal signal reception and transmission. Information about beam elevation, indicating the angle at which the beams are directed, assists the network in precisely aiming the signal towards the UE. Furthermore, metrics related to the UE's position, direction, and orientation further enrich the network's understanding of the device's location and movement patterns.

Further, beam prediction can also be conducted at the UE. The scope of UE-side beam management involves predictions related to downlink transmit beam prediction, which anticipate the beams through which downlink data will be transmitted to the UE. Downlink receive beam prediction focuses on the beams at the UE that will be optimal for the downlink data from the base station. Beam pair prediction is directed to a transmit beam for the downlink at the base station and its corresponding receive beam at the UE. A range of channel metrics serves as the foundation for effective beam management and prediction. These metrics include Received Signal Reference Power (RSRP) values, which reflect the signal strength at the UE. Channel State Information (CSI) is another metric, providing insights into the current state of the channel between the UE and the network. Beam angles inform how the beams are oriented in space, allowing for precise beamforming. Channel Quality Indicator (CQI) provides information about the quality of the channel, guiding decisions related to beam selection. These channel metrics collectively empower the UE to make informed decisions about beam management.

Although FIGS. 7-8 illustrate the techniques of spatial and frequency domain beam management using time series information with a UE receiving downlink beams from a base station as an example, the same techniques can be equally applied to a base station receiving uplink beams from a UE.

Figure 9:
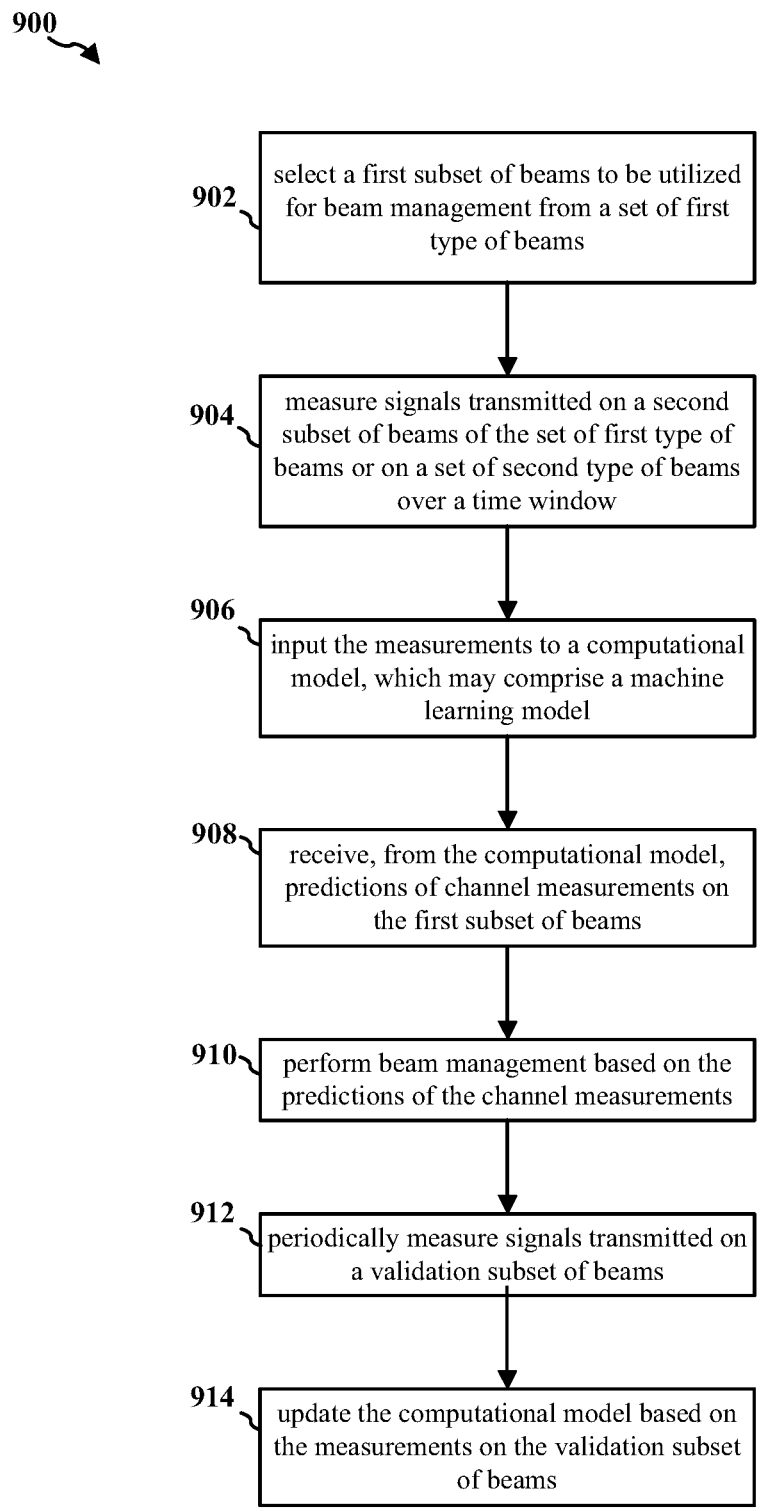
FIG. 9 is a flow chart of a method (process) for predicting channel measurements on beams.

FIG. 9 is a flow chart 900 of a method (process) for predicting channel measurements on beams. The method may be performed by wireless equipment, which may be a UE or a base station (e.g., UE 704, the UE 804, the UE 250, the base station 702, the base station 802, the base station 210). In operation 902, the wireless equipment selects a first subset of beams (e.g., the beams 712, 722, 723 and 734 or beams 830, 833 and 836) the to be utilized for beam management from a set of first type of beams used for communication with a base station or a UE. In operation 904, the wireless equipment measures signals transmitted on a second subset of beams (e.g., the beams 715, 716, 729 and 730) of the set of first type of beams or on a set of second type of beams over a time window (e.g., the beams 820, 821, 823, 824, and 825).

In operation 906, the wireless equipment inputs the measurements to a computational model, which may comprise a machine learning model trained on historical channel measurements on the second subset of beams or on the set of second type of beams. The historical measurements may comprise time series data captured over the time window.

In operation 908, the wireless equipment receives, from the computational model, predictions of channel measurements on the first subset of beams. In certain configurations, the predictions are measurements on a top-k set of beams from the set of beams, where the top-k set comprises k beams predicted to have optimal measurements, such as the top k predicted received signal reference power (RSRP) values.

In operation 910, the wireless equipment performs beam management based on the predictions of the channel measurements. The beam management may include selecting one or more optimal beams for communicating with the base station based on the predictions of the measurements.

In certain configurations, the signals transmitted on the set of second type of beams are measured, where the set of second type of beams is in a first frequency band, and the set of first type of beams is in a second frequency band. The first frequency band may be in FR1, and the second frequency band may be in FR2. Historical data from FR1 can provide insights for frequency beam management in FR2, improving performance and efficiency.

In certain configurations, the wireless equipment is a UE, and the first type of beams and the second type of beams are transmitted by a base station and received by the UE in a downlink direction. In certain configurations, the wireless equipment is a base station, and the first type of beams and the second type of beams are transmitted by a UE and received by the base station in an uplink direction.

In operation 912, the wireless equipment periodically measures signals transmitted on a validation subset of beams. In operation 914, the wireless equipment updates the computational model based on the measurements on the validation subset of beams. Updating the computational model may comprise updating a subset of weights of the computational model.

The measurements may comprise at least one of: a received signal reference power (RSRP), a channel state information (CSI), a beam angle, or a channel quality indicator (CQI).

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of wireless equipment, comprising:
   selecting a first subset of beams to be utilized for beam management from a set of first type of beams used for communication with a base station or a UE, wherein the set of first type of beams is in a second frequency band in FR2;
   measuring signals transmitted on a set of second type of beams over a time window to obtain historical measurements collected over the time window, wherein the set of second type of beams is in a first frequency band in FR1 and different from the second frequency band;
   inputting the historical measurements collected over the time window on the set of second type of beams in the first frequency band to a computational model; and
   receiving, from the computational model, predictions of channel measurements on the first subset of beams in the second frequency band generated based on the historical measurements collected over the time window on the set of second type of beams in the first frequency band.

2. The method of claim 1, further comprising: performing beam management based on the predictions of the channel measurements.

3. The method of claim 2, wherein the performing beam management includes selecting one or more optimal beams for communicating with the base station or the UE based on the predictions of the channel measurements.

4. The method of claim 1, wherein the wireless equipment is a UE, wherein the first type of beams and the second type of beams are transmitted by a base station and received by the UE in a downlink direction.

5. The method of claim 1, wherein the wireless equipment is a base station, wherein the first type of beams and the second type of beams are transmitted by a UE and received by the base station in an uplink direction.

6. The method of claim 1, wherein the computational model comprises a machine learning model trained on historical channel measurements on the set of second type of beams.

7. The method of claim 6, wherein the historical channel measurements comprise time series data captured over the time window.

8. The method of claim 1, further comprising:
   periodically measuring signals transmitted on a validation subset of beams; and
   updating the computational model based on the measurements on the validation subset of beams.

9. The method of claim 8, wherein updating the computational model comprises updating a subset of weights of the computational model.

10. The method of claim 1, wherein the historical measurements comprise at least one of: a received signal reference power (RSRP), a channel state information (CSI), a beam angle, or a channel quality indicator (CQI).

11. The method of claim 1, wherein the predictions are measurements on a top-k set of beams from the set of first type of beams, wherein the top-k set comprises k beams predicted to have optimal measurements.

12. The method of claim 11, wherein the top-k set of beams is determined based on beams having the top-k predicted received signal reference power (RSRP) values.

13. The method of claim 1, further comprising selecting a beam for communication with the base station or the UE based on the received predictions.

14. An apparatus for wireless communication, the apparatus being wireless equipment, comprising:
a memory; and
at least one processor coupled to the memory and configured to:
select a first subset of beams to be utilized for beam management from a set of first type of beams used for communication with a base station or a UE, wherein the set of first type of beams is in a second frequency band in FR2;
measure signals transmitted on a set of second type of beams over a time window to obtain historical measurements collected over the time window, wherein the set of second type of beams is in a first frequency band in FR1 and different from the second frequency band;
input the historical measurements collected over the time window on the set of second type of beams in the first frequency band to a computational model; and
receive, from the computational model, predictions of channel measurements on the first subset of beams in the second frequency band generated based on the historical measurements collected over the time window on the set of second type of beams in the first frequency band.

15. The apparatus of claim 14, wherein the at least one processor is further configured to perform beam management based on the predictions of the channel measurements.

16. The apparatus of claim 15, wherein to perform the beam management, the at least one processor is further configured to select one or more optimal beams for communicating with the base station based on the predictions of the channel measurements.

17. A non-transitory computer-readable medium storing computer executable code for wireless communication of wireless equipment, comprising code to:
select a first subset of beams to be utilized for beam management from a set of first type of beams used for communication with a base station or a UE, wherein the set of first type of beams is in a second frequency band in FR2;
measure signals transmitted on a set of second type of beams over a time window to obtain historical measurements collected over the time window, wherein the set of second type of beams is in a first frequency band in FR1 and different from the second frequency band;
input the historical measurements collected over the time window on the set of second type of beams in the first frequency band to a computational model; and
receive, from the computational model, predictions of channel measurements on the first subset of beams in the second frequency band generated based on the historical measurements collected over the time window on the set of second type of beams in the first frequency band.

* * * * *